(12) United States Patent
Ellsworth (10) Patent No.: US 9,732,775 B2
(45) Date of Patent: Aug. 15, 2017

(54) FLOW STRAIGHTENER APPARATUS AND SYSTEMS FOR DUCTED AIR

(71) Applicant: The Boeing Company, Chicago, IL (US)

(72) Inventor: Scott P. Ellsworth, Everett, WA (US)

(73) Assignee: The Boeing Company, Chicago, IL (US)

( * ) Notice: Subject to any disclaimer, the term of this patent is extended or adjusted under 35 U.S.C. 154(b) by 91 days.

(21) Appl. No.: 14/749,482

(22) Filed: Jun. 24, 2015

(65) Prior Publication Data

US 2016/0377100 A1    Dec. 29, 2016

(51) Int. Cl.
F15D 1/02       (2006.01)
F15D 1/00       (2006.01)
B64D 13/06      (2006.01)

(52) U.S. Cl.
CPC .............. *F15D 1/025* (2013.01); *B64D 13/06* (2013.01); *F15D 1/0005* (2013.01); *B64D 2013/0688* (2013.01)

(58) Field of Classification Search
CPC ........... F15D 1/025; F15D 1/0005; F15D 1/04
USPC ......................................................... 138/39
See application file for complete search history.

(56) References Cited

U.S. PATENT DOCUMENTS

| | | | |
|---|---|---|---|
| 814,694 A * | 3/1906 | Henderson | B05B 15/001 138/37 |
| 4,517,813 A | 5/1985 | Eggebrecht et al. | |
| 5,405,106 A * | 4/1995 | Chintamani | G01M 9/04 138/39 |
| 5,755,557 A * | 5/1998 | Alizadeh | F04D 29/326 416/169 A |
| 6,302,640 B1 | 10/2001 | McKelvey | |
| 8,104,412 B2 * | 1/2012 | Zarnescu | B01F 5/061 110/232 |
| 8,696,193 B2 * | 4/2014 | Herbstritt | B01F 3/12 366/338 |
| 2007/0245718 A1 * | 10/2007 | Cheng | B01F 3/04049 60/286 |
| 2014/0133268 A1 * | 5/2014 | Cornaglia | F01N 3/2892 366/337 |
| 2014/0369841 A1 * | 12/2014 | Duchene | F03B 13/264 416/223 A |
| 2016/0053774 A1 * | 2/2016 | Tarnowski | F04D 17/12 415/207 |

* cited by examiner

*Primary Examiner* — Paul R Durand
*Assistant Examiner* — David Deal
(74) *Attorney, Agent, or Firm* — McDonnell Boehnen Hulbert & Berghoff LLP (57) ABSTRACT

A flow-straightener apparatus and associated systems for converting a rotating airflow into a substantially longitudinally directed airflow is presented. A first annular frame is provided and a second annular frame arranged concentrically within the first annular frame. A plurality of flow-straightener vanes are also provided, each having a first end coupled to an interior surface of the first annular frame and a second end coupled to an exterior surface of the second annular frame. The plurality of flow-straightener vanes each also have a leading edge and a trailing edge and each vane has a curved segment.

19 Claims, 6 Drawing Sheets

FLOW STRAIGHTENER APPARATUS AND SYSTEMS FOR DUCTED AIR

TECHNICAL FIELD

The disclosure is related to a ducted air system and, more particularly, to a ducted air system for mixing air from an air conditioning pack with recirculated air from an aircraft cabin.

BACKGROUND

In aircraft cooling systems, conditioned supply air to an aircraft cabin may be recirculated and mixed with outlet air from several air conditioning packs via a mix manifold and ductwork system. The ductwork typically includes separate ducts coupled to opposite sides of a lower portion of the mix manifold to convey recirculated air from different zones of the aircraft cabin for mixing with the air from corresponding air conditioning packs. Each of these ducts may be coupled to the mix manifold such that air flow is directed tangentially into the mix manifold or toward the center of the mix manifold, depending on various design considerations. In single or double air conditioning pack operation that involves tangential-directed airflow into the mix manifold, air may still be rotating in the upper portion of the mix manifold. This, in turn, may lead to rotating airflow in an outlet branch of the mix manifold that may cause air pressure oscillations. The result may be strong vibration of the ductwork and manifold, which is undesirable as it may cause premature failure of the ductwork. In addition, these air pressure oscillations may also periodically change zone-to-zone airflow balance in the ductwork.

SUMMARY

While tangential-directed airflow entering the mix manifold may result in rotating airflow therein, this rotation may aid in separation of water condensate from the recirculated aircraft cabin air. This rotation may also be desirable in the lower portion of the mix manifold to further mix the air streams from both ducts coupled to the mix manifold. This is particularly advantageous in the instance in which a single air conditioning pack is in operation, since mixing among different zones of the aircraft cabin not directly coupled to the working air conditioning pack may be desired within the mix manifold to better cool the recirculating air. To counteract any air pressure oscillations that may result from this rotating airflow, the disclosed embodiments provide a flow straightener apparatus and system configured to be disposed within the mix manifold. These embodiments may also beneficially recover pressure velocity to minimize pressure drop compared to other known flow straighteners.

In a first aspect, a flow-straightener apparatus is provided including a first annular frame. A second annular frame is arranged concentrically within the first annular frame. The flow-straightener apparatus also includes a plurality of flow-straightener vanes that each have a first end coupled to an interior surface of the first annular frame and a second end coupled to an exterior of the second annular frame. The plurality of flow-straightener vanes each also have a leading edge and a trailing edge, and each flow-straightener vane has a curved segment.

A second aspect is directed to a flow-straightener system for converting rotational airflow to longitudinal directed airflow. The flow-straightener system provides a mix manifold that includes a cylindrical chamber and a flow-straightener apparatus according to the first aspect. The flow-straightener apparatus is arranged within an upper portion of the mix manifold and is concentrically arranged within the cylindrical chamber of the mix manifold.

The features, functions, and advantages that have been discussed can be achieved independently in various embodiments or may be combined in yet other embodiments, the further details of which can be seen with reference to the following description and drawings.

BRIEF DESCRIPTION OF THE FIGURES

The present disclosure will become more fully understood from the more detailed description presented below and the accompanying drawings which are presented by way of illustration only, and thus, are not limitations of the present disclosure, and wherein.

Corresponding parts are marked with the same reference symbols in all figures.

DETAILED DESCRIPTION

Figure 1:
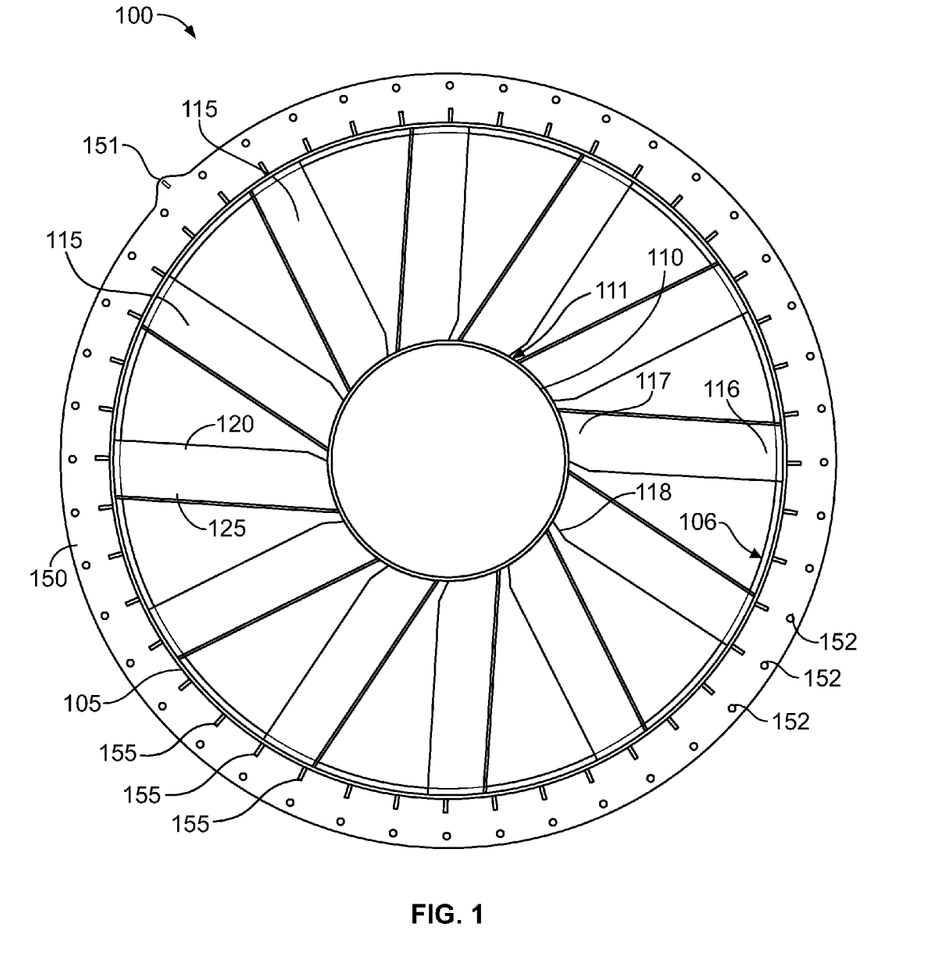
FIG. 1 is a diagrammatic representation of a top view of a flow-straightener apparatus according to one embodiment of the disclosure.

FIG. 1 depicts a flow-straightener apparatus 100 for converting a rotating airflow into a substantially longitudinally directed airflow. The flow-straightener apparatus 100 includes a first annular frame 105. A second annular frame 110 is arranged concentrically within this first annular frame 105. The flow-straightener apparatus 100 also includes a plurality of flow-straightener vanes 115 each having a first end 116 coupled to an interior surface 106 of the first annular frame 105 and a second end 117 coupled to an exterior 111 of the second annular frame 110. In one embodiment, these vanes 115 may be spaced equidistantly apart from each other about the perimeter of the second annular frame 110 to more evenly receive and distribute airflow entering and exiting the flow-straightener apparatus 100. Typically, a majority of the rotating airflow to be intercepted by the flow-straightener apparatus 100 may be concentrated between the first and second annular frames 105, 110. In addition, in the middle of the rotating airflow, the air velocity may be lower and some of the airflow may be directed downward relative to the flow-straightener apparatus 100. As such, the center of the second annular frame 110 does not require the use of flow-straightener vanes and may be left open, as shown in FIG. 1. In various embodiments, the first and second annular frames 105, 110 and the flow-straightener vanes 115 may be molded as a single unit using thermoplastics, metals or metal alloys, for example. Alternatively, the flow-straightener vanes 115 may be coupled to the first and second annular frames 105, 110 via conventional methods such as welding, adhesives, fasteners or any other suitable fabrication technique.

In addition, the plurality of flow-straightener vanes 115 each have a leading edge 120 and a trailing edge 125. In one embodiment, the leading edge 120 of each of the plurality of the flow-straightener vanes 115 may be arranged along an axis that intersects a common center of the first annular frame 105 and the second annular frame 110. This arrangement may beneficially align the leading edge to be substantially perpendicular to the rotating airflow in order to minimize airflow stack-up on the outer wall of any chamber, duct or air passage, for example, in which the flow-straightener apparatus 100 may be disposed during use. In another embodiment, the leading edge 120 and the trailing edge 125 of each of the plurality of flow-straightener vanes 115 may be arranged parallel to each other, resulting in a turning vane profile that is substantially constant between the first and second annular frames 105, 110. This arrangement may beneficially increase pressure recovery by the flow straightener apparatus 100 and may also result in manufacturing efficiencies in an embodiment in which the flow straightener apparatus is made of sheet metal.

Figure 2:
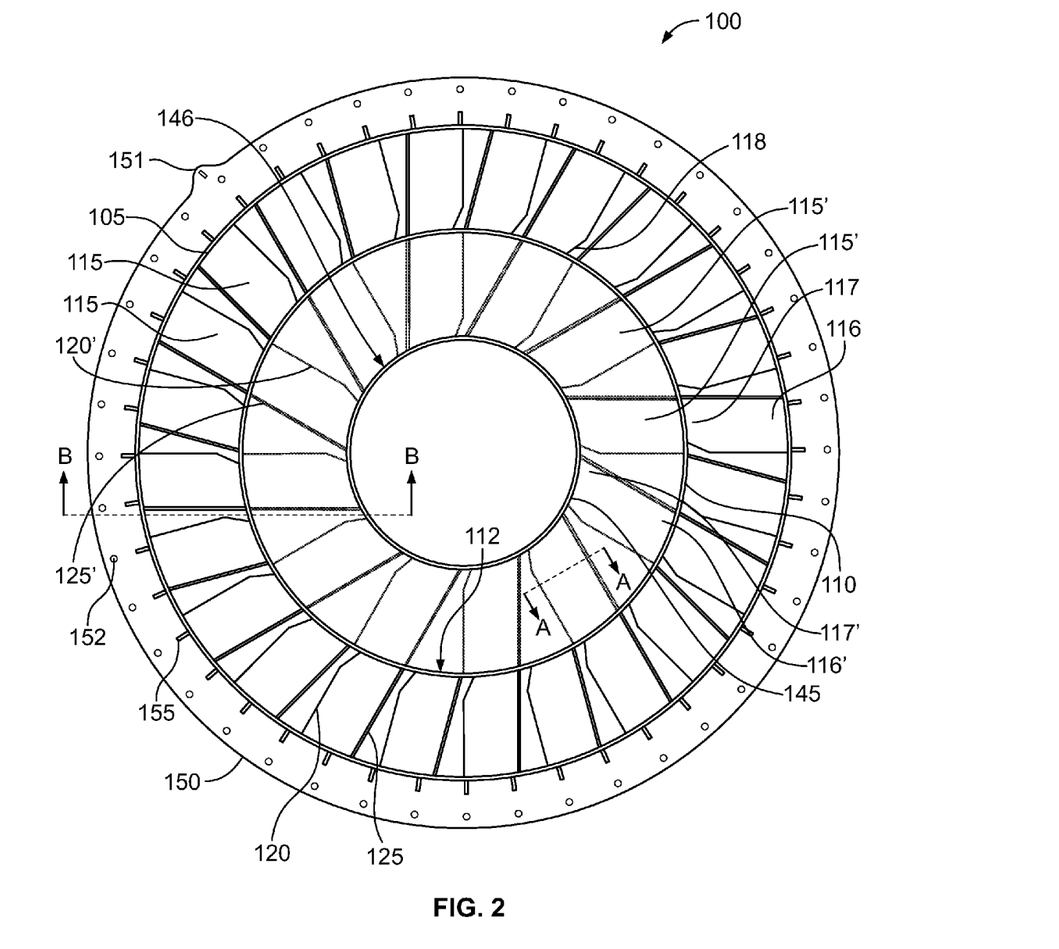
FIG. 2 is a diagrammatic representation of a top view of a flow-straightener apparatus according to another embodiment of the disclosure.
Figure 2A:
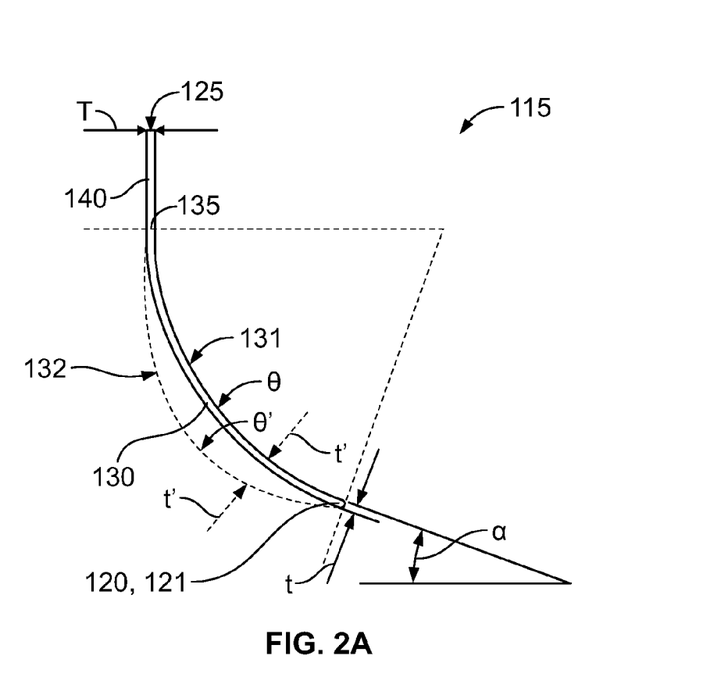
FIG. 2A is a diagrammatic representation of a cross-sectional side view of a flow-straightener vane of section A:A in FIG. 2.
Figure 2B:
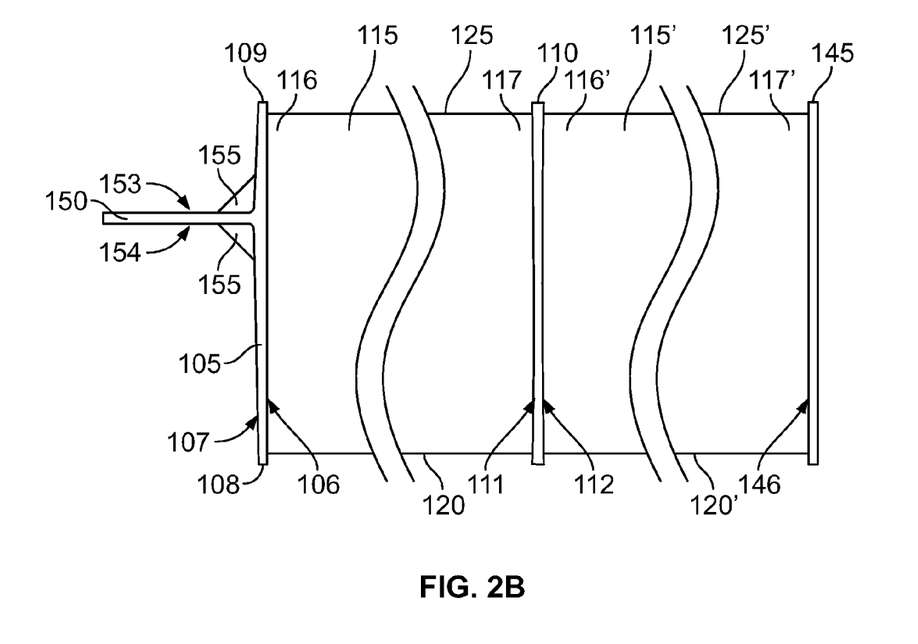
FIG. 2B is a diagrammatic representation of a cross-sectional side view of a flow-straightener apparatus of section B:B in FIG. 2.

In a further embodiment, a tip 121 of the leading edge 120 of each of the plurality of flow-straightener vanes 115 may have a radius of curvature, as shown in FIG. 2A:A, to render the tip 121 more aerodynamic than a blunt surface, for example. This aerodynamic tip 121 may help avoid airflow separation from the flow-straightener vane 115 as air enters the flow-straightener apparatus 100. In an additional embodiment, the trailing edge 125 may have a thickness (T) that is the same as or greater than a thickness (t) of the leading edge of each of the plurality of flow-straightener vanes. A configuration with a thicker trailing edge 125 may reduce flow separation from the flow-straightener vane 115 and thereby advantageously reduce or maintain any pressure drop in an airflow passage in which the flow-straightener apparatus 100 is used.

The plurality of flow-straightener vanes 115 also each have a curved segment 130. In one embodiment, shown in FIG. 2A:A, the curved segment 130 may extend between the leading edge 120 and a transition point 135 on the flow-straightener vane 115. Depending on the method of manufacture, the curved segments 130 of the flow-straightener vanes 115 may optionally overlap at their second ends 117. In a further embodiment, the plurality of flow-straightener vanes 115 may also each have a straight segment 140 extending between the transition point 135 and the trailing edge 125. In yet another embodiment, the straight segment 140 may extend in a direction substantially parallel to a longitudinal axis of the first annular frame 105. In operation, the leading edge 120 of the flow-straightener vane 115 may intercept and direct rotational airflow along the curved segment 130 to the straight segment 140 such that the airflow exits the flow-straightener apparatus 100 moving along the direction of the straight segment 140 and the trailing edge 125.

In a further embodiment, the leading edge 120 of each of the plurality of flow-straightener vanes 115 may be arranged at an approach angle ($\alpha$) relative to a plane that is perpendicular to a longitudinal axis of the first annular frame 105, as shown in FIG. 2A:A. This approach angle ($\alpha$) is contemplated to intercept rotational airflow that may be moving at an angle that is more radial than longitudinal relative to the longitudinal axis of the flow-straightener apparatus 100. The approach angle ($\alpha$) is intended to approximate the average angle of the rotational airflow to be intercepted, which may vary based on operating conditions, including the angle at which airflow is introduced into any air passage in which the flow-straightener apparatus 100 is disposed during use.

In one embodiment, shown in FIG. 2A:A, the curved segment 130 of each of the plurality of flow-straightener vanes 115 may have a common radius of curvature ($\theta$) for both a front surface 131 and a back surface 132 such that the thickness (t) of the flow-straightener vane 115 is constant along the curved segment 130. In an alternative embodiment, the curved segment 130 of each of the plurality of flow-straightener vanes 115 may have a front surface 131 with a first radius of curvature ($\theta$) and a back surface 132 with a second radius of curvature ($\theta'$) resulting in a variable thickness (t') shown in dashed relief between the leading edge 120 and the transition point 135. A configuration having a second radius of curvature ($\theta'$) may reduce flow separation from the flow-straightener vane 115 and thereby advantageously reduce or maintain any pressure drop in an airflow passage in which the flow-straightener apparatus 100 is used. In another embodiment, the flow-straightener vane 115 may include both a thicker trailing edge 125 and a second radius of curvature ($\theta'$) to maximize reduction of pressure drop. In another embodiment, a cross-section of each of the plurality of flow-straightener vanes 115 may vary along a length of the vane 115 between the first annular ring 105 and the second annular ring 110. For example, a chord of the vane 115 may be longer at the first end 116 near the first annular frame 105 than at the second end 117 near the second annular frame 110. In this arrangement, the second annular rim may have a smaller diameter. In addition, the flow straightener vanes 115 may not overlap near the second annular frame 110 and therefore may avoid inclusion of notch 118, discussed below. Alternatively, the leading edge 120 of each vane 115 may define a notch 118 at the second end 117 that may assist with mold-release during fabrication.

Referring now to FIG. 2, the flow-straightener apparatus 100 may further include a third annular frame 145 arranged concentrically within the second annular frame 110. In this embodiment, a second plurality of flow-straightener vanes 115' are provided, each having a first end 116' coupled to an interior surface 112 of the second annular frame 110 and a second end 117' coupled to an exterior surface 146 of the third annular frame 145. In this arrangement, the second annular frame 110 may provide additional rigidity or support to the flow straightener vanes 115, 115' and may minimize any torsion or vibration that may be imparted on the flow-straightener vanes 115, 115' during operation. In addition, as described below, the inclusion of the third annular frame 145 permits use of more flow straightener vanes 115 between the first and second annular frames 105, 110, in the region where a majority of rotating airflow is typically concentrated, to increase the straightening effect on the airflow and to further reduce pressure drop. In addition, the flow straightener vanes 115, 115' of this embodiment with a third annular frame 145 are preferably shorter than the flow-straightener vanes 115 employed with the embodiment having only the first and second annular frames 105, 110. All of the foregoing embodiments described with respect to flow-straightener vanes 115 are equally applicable to the second plurality of flow-straightener vanes 115'. For example, the second plurality of flow-straightener vanes 115' each have a leading edge 120' and a trailing edge 125'. The second plurality of flow-straightener vanes 115' each also have a curved segment similar to curved segment 130 shown in FIG. 2A:A.

In a further embodiment, the first plurality of flow-straightener vanes 115 arranged between the first and second annular frames 105, 110 are preferably greater in number than the second plurality of flow-straightener vanes 115' arranged between the second annular frame and the third annular frame 110, 145. In one embodiment, the ratio of the first plurality of flow-straightener vanes 115 to the second plurality of flow-straightener vanes 115' is 2:1. For example, the first plurality of flow-straightener vanes 115 may be 24 vanes and the second plurality of flow-straightener vanes 115' may be 12 vanes. In one embodiment, half of the first plurality of flow-straightener vanes 115 may be aligned with the second plurality of flow-straightener vanes 115' and the other half of the first plurality of flow-straightener vanes 115 may be aligned in between the second plurality of flow-straightener vanes 115', as shown in FIG. 2.

In one embodiment, the flow-straightener apparatus 100 may also include a flange 150 that is coupled to and radially extends from an exterior surface 107 of the first annular frame 105 at or between an outlet end 109 and an inlet end 108. Alternatively, the flange may be arranged on the first annular frame 105 between a location at least one inch below the outlet end 109 of the first annular frame 105 down to the inlet end 108 of the first annular frame 105. In one embodiment, the width of the first annular frame 105 may taper outward from the inlet end 108 to the coupling with the flange 150 and taper outward from the outlet end 109 to the coupling with the flange 150, such that the first annular frame 105 is widest at or near the flange 150. In use, this flange 150 may be coupled to an airflow passage having a corresponding mating flange or other mounting surface. In another embodiment, an alignment tab 151 may further extend from the flange and may be received in a corresponding groove defined in an airflow passage to align through-holes 152 in the flange 150 with corresponding through-holes or protrusions on a mating flange or mating surface to receive a connector, such as a bolt or a locking pin. In a further embodiment, a plurality of reinforcing webs 155 may be coupled between the flange 150 and the first annular frame 105 along the top 153 of the flange 150, the bottom 154 of the flange 150 or both in order to further support the coupling of the flange 150 to the first annular frame 105.

In one example embodiment, the flow-straightener apparatus 100 may have a configuration in which the first annular frame 105 has a radius ranging from about 11.5 inches to about 12 inches, and the second annular frame 110 has a radius ranging from about 4 inches to about 8.25 inches. In a further embodiment including a third annular frame 145, this third annular frame 145 may have a radius of about 4.0 inches to about 4.25 inches. In another embodiment including a flange 150, the flange 150 may have a width ranging from about 1.8 inches to about 2.25 inches extending radially from the exterior surface 107 of first annular frame 105. In a further embodiment including flange 150, the width of the first annular frame at inlet end 108 and at outlet end 109 may be about 0.06 inches and may taper outward to the flange coupling to a width of about 0.13 inches. With respect to the flow-straightener vanes, the curved segment may have a radius of curvature of about 3 inches and may extend in an arc of about 70 degrees, while the straight segment may have a length of at least one inch. In another embodiment, the flow straightener vanes 115 may be spaced apart by about 2.7 inches at their mid points. In various alternative embodiments, the spacing of the flow straightener vanes 115 at their mid points may be about 75% of the radius of curvature of the curved segments of the flow straightener vanes 115. In addition, the sum of the arc angle of the curved segment with the approach angle ($\alpha$) of the leading edge 120 of each of the flow-straightener vanes 115 may be about 90 degrees. In addition, the approach angle ($\alpha$) of the leading edge 120 may be arranged to be about +/−5 degrees of the angle of the rotating airflow. Other dimensions for each of the foregoing features are contemplated depending upon the specific application and operating conditions for the flow-straightener apparatus 100.

Figure 3:
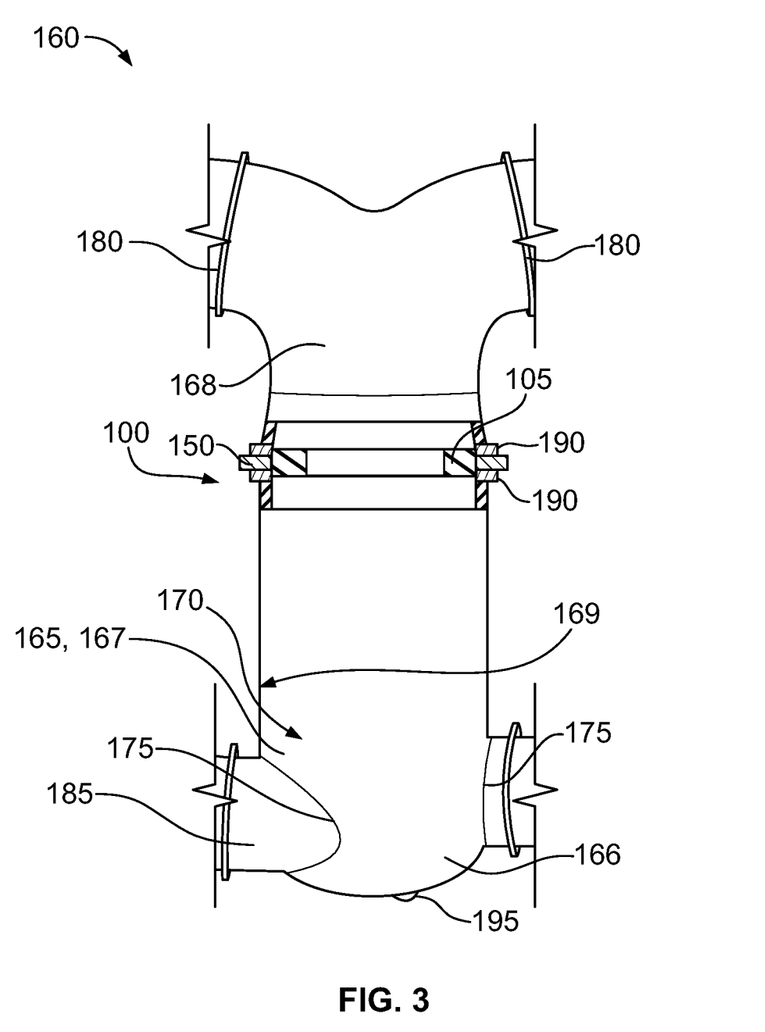
FIG. 3 is a diagrammatic representation of a side view, including a partial cross-section, of one embodiment of a flow-straightener system of FIG. 2.

Referring now to FIG. 3, a flow-straightener system 160 is shown having a mix manifold 165 that includes a cylindrical chamber 170 that may act as an airflow passage. In one embodiment, the mix manifold 165 further includes two inlet openings 175 coupled to opposite sides of a lower portion 166 of a mix manifold sidewall 167 and includes two outlet openings 180 coupled to an upper portion 168 of the mix manifold 165. In another embodiment, at least one adapter 185 may be coupled to one of the two inlet openings 175 and configured to direct airflow tangentially into the mix manifold 165.

The flow-straightener system 160 also includes a flow-straightener apparatus 100 according to any of the foregoing embodiments discussed above. The flow-straightener apparatus 100 is arranged within an upper portion 168 of the mix manifold 165 such that the flow-straightener apparatus 100 is concentrically arranged within the cylindrical chamber 170. This arrangement may permit air that is introduced into the cylindrical chamber 170 by way of the two inlet openings 175 to mix together in the lower portion 166 of the mix manifold 165 before entering the flow-straightener apparatus 100.

In one embodiment, as discussed above, the flow-straightener apparatus may include a flange 150 coupled to an exterior surface 107 of the first annular frame 105. The mix manifold 165 may likewise include at least one flange 190 on an exterior surface 169 of the mix manifold 165. These flanges 150, 190 may be designed to mate together with corresponding through-holes 152 or male-female connectors. In one embodiment, flange 150 of the flow-straightener apparatus 100 may be sandwiched between two flanges 190 of the mix manifold 165. These flanges 150, 190 may also have any of the features described above with respect to the embodiments of the flow straightener apparatus 100. In operation, the flanges 150, 190 may beneficially prevent or minimize water condensation from advancing along the interior surface 169 of the mix manifold 165 from the lower portion 166 to the upper portion 168, similar to a scupper ring. This may allow the condensate to instead drain from the mix manifold 165 via a drainage opening 195 in the bottom of the mix manifold 165.

In one embodiment, the straight segment 140 of each of the plurality of flow-straightener vanes 115, 115' of the flow-straightener apparatus 100 may extend in a direction parallel to a common longitudinal axis of the first annular frame 105 and the mix manifold 165. As a result, airflow exiting the flow-straightener apparatus 100 may be directed substantially straight or longitudinally in the same direction as the orientation of the straight segment 140 thereby reducing or minimizing vibrations in the air recirculation system and ductwork that may be coupled to the flow-straightener system 160.

Figure 4:
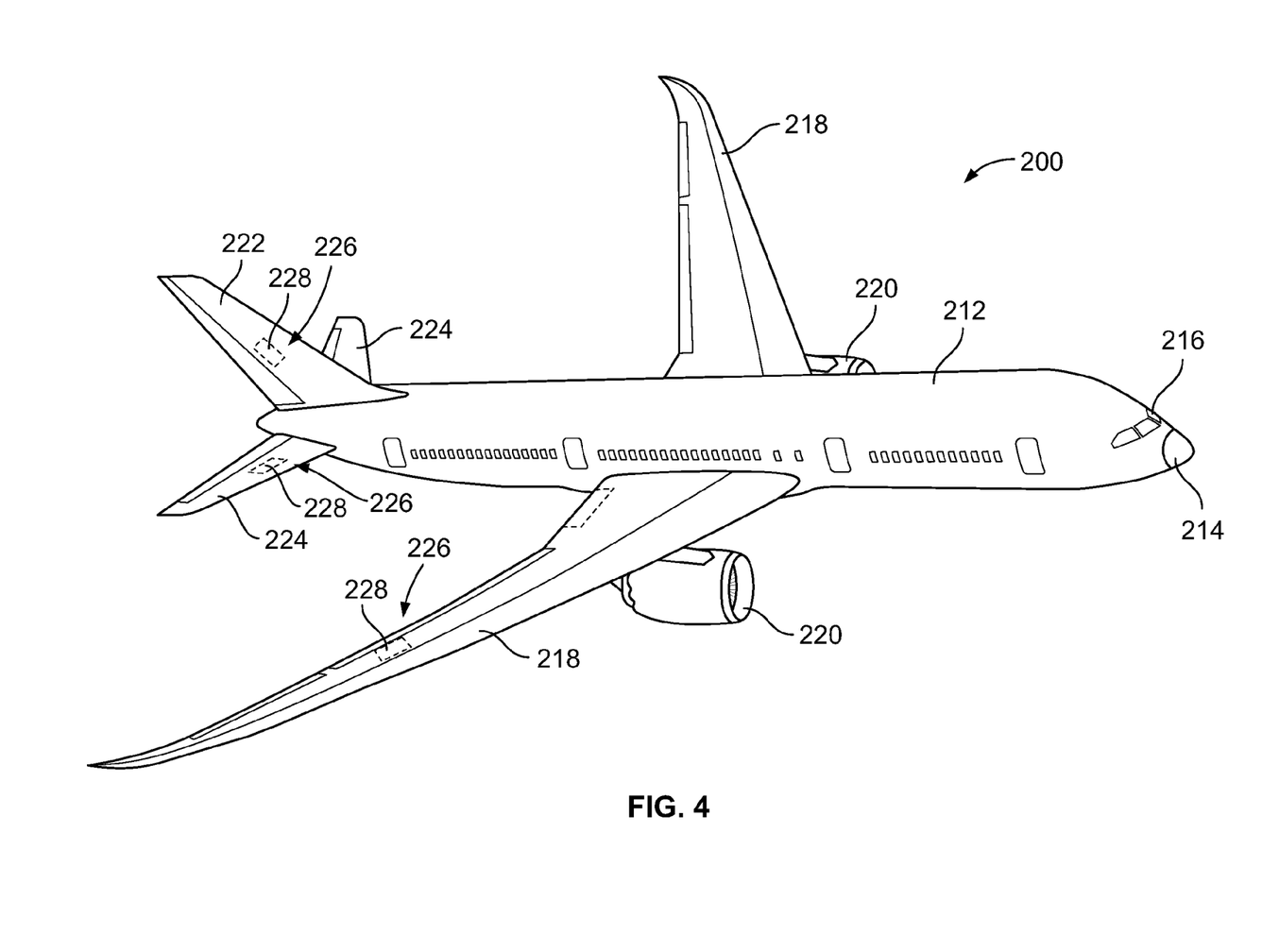
FIG. 4 is a diagrammatic representation of a perspective view of an aircraft that may incorporate a flow-straightener apparatus and/or system in accordance with one or more embodiments disclosed herein.

FIG. 4 is an illustration of a perspective view of an aircraft 200 that may incorporate the flow-straightener apparatus and flow-straightener systems according to one or more of the embodiments of the present disclosure. As shown in FIG. 4, the aircraft 200 comprises a fuselage 212, a nose 214, a cockpit 216, wings 218 operatively coupled to the fuselage 212, one or more propulsion units 220, a tail vertical stabilizer 222, and one or more tail horizontal stabilizers 224. Although the aircraft 200 shown in FIG. 4 is generally representative of a commercial passenger aircraft, the flow-straightener apparatus and flow-straightener systems, as disclosed herein, may also be employed in other types of aircraft or air vehicles. More specifically, the teachings of the disclosed embodiments may be applied to other passenger aircraft, cargo aircraft, military aircraft, rotorcraft, and other types of aircraft or aerial vehicles, as well as aerospace vehicles, satellites, space launch vehicles, rockets, and other aerospace vehicles. It may also be appreciated that embodiments of structures and methods in accordance with the disclosure may be utilized in other transport vehicles, such as boats and other watercraft, trains, automobiles, trucks, buses, or other suitable transport vehicles utilizing the flow-straightener apparatus and flow-straightener systems as disclosed herein.

Figure 5:
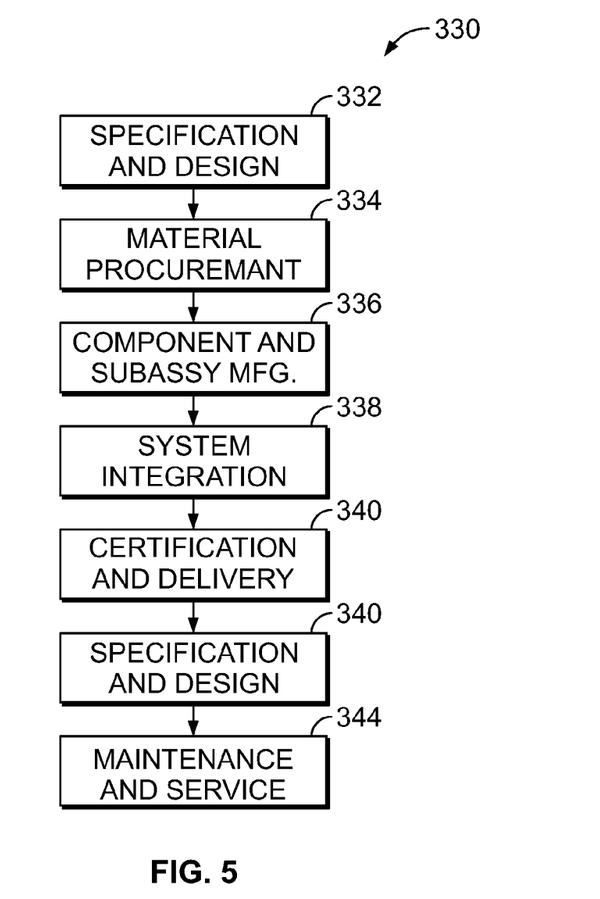
FIG. 5 is a flow diagram of an embodiment of an aircraft production and service method of the disclosure.
Figure 6:
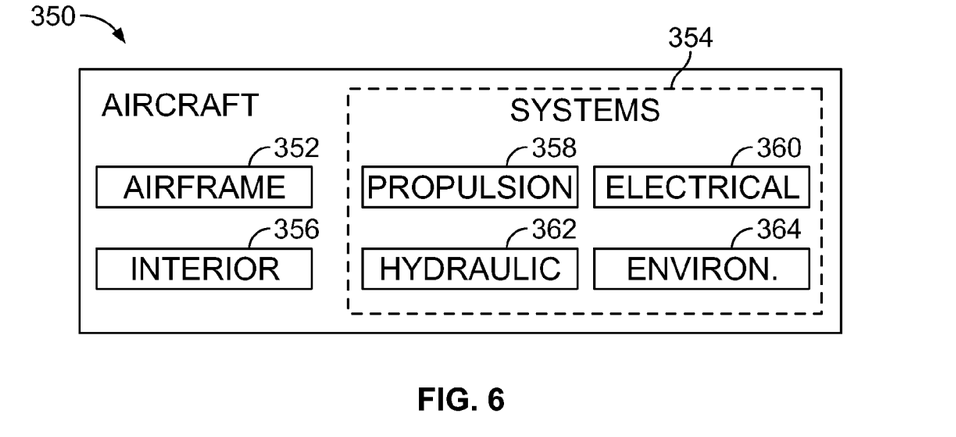
FIG. 6 is a functional block diagram of an aircraft.

Embodiments of the disclosure may find use in a variety of potential applications, particularly in the transportation industry, including for example, aerospace, marine, automotive applications and other application where the flow-straightener apparatus and flow-straightener systems may be used. Therefore, referring now to FIGS. 5 and 6, embodiments of the disclosure may be used in the context of an aircraft manufacturing and service method 330 as shown in FIG. 5 and an aircraft 350 as shown in FIG. 6. Aircraft applications of the disclosed embodiments may include, for example, without limitation, the design and fabrication of flow-straightener apparatus and flow-straightener systems as disclosed herein.

During pre-production, exemplary method 330 may include specification and design 332 of the aircraft 350 and material procurement 334. As just one example, the specification and design of the aircraft-related air recirculation system and ductwork that may use the flow-straightener apparatus and flow-straightener system disclosed herein, may be determined at this step. As just one example, at this step, it may be determined that a specific flow-straightener system and arrangements for the flow-straightener apparatus are needed.

During production, component and subassembly manufacturing 336 and system integration 338 of the aircraft 350 takes place. As explained in greater detail above, FIGS. 1-3 illustrate one preferred type of flow-straightener apparatus and flow-straightener system for converting rotational airflow to longitudinal-directed airflow in accordance with two aspects of the present disclosure. After such a component and subassembly manufacturing step, the aircraft 350 may go through certification and delivery 340 in order to be placed in service 342. While in service by a customer, the aircraft 350 is scheduled for routine maintenance and service 344, which may also include modification, reconfiguration, refurbishment, and so on.

Each of the process steps of exemplary method 330 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 6, the aircraft 350 produced by exemplary method 330 may include an airframe 352 with a plurality of high-level systems 354 and an interior 356. Examples of high-level systems 354 may include one or more of a propulsion system 358, an electrical system 360, a hydraulic system 362, and an environmental system 364. Any number of other systems may be included. Although an aerospace example is shown, the principles of the disclosure may be applied to other industries, such as the marine and automotive industries.

Apparatus and systems embodied herein may be employed during any one or more of the stages of the aircraft manufacturing and service method 330. For example, components or subassemblies corresponding to production process may be fabricated or manufactured in a manner similar to components or subassemblies produced while the aircraft 350 is in service. Also, one or more apparatus embodiments, system embodiments, or a combination thereof may be utilized during the production stages 332 and 334, for example, by substantially expediting assembly of or reducing the cost of an aircraft 350. Similarly, one or more of apparatus embodiments, system embodiments, or a combination thereof may be utilized while the aircraft 350 is in service, for example and without limitation, to maintenance and service 344.

The foregoing description of the specific embodiments will reveal the general nature of the disclosure so others can, by applying current knowledge, readily modify and/or adapt for various applications such specific embodiments without departing from the generic concept, and therefore such adaptations and modifications are intended to be comprehended within the meaning and range of equivalents of the disclosed embodiments. It is to be understood that the phraseology or terminology herein is for the purpose of description and not of limitation.

What is claimed:

1. A flow-straightener apparatus, comprising:
a first annular frame;
a second annular frame arranged concentrically within the first annular frame; and
a plurality of flow-straightener vanes each having a first end coupled to an interior surface of the first annular frame and a second end coupled to an exterior of the second annular frame, wherein the plurality of flow-straightener vanes each have a leading edge and a trailing edge, wherein the plurality of flow-straightener vanes each have a curved segment, wherein the curved segment of each of the plurality of flow-straightener vanes extends between the leading edge and a transition point and wherein the plurality of flow-straightener vanes each have a straight segment extending between the transition point and the trailing edge.

2. The flow-straightener apparatus of claim 1, wherein the leading edge of each of the plurality of flow-straightener vanes is arranged at an approach angle ($\alpha$) relative to a plane that is perpendicular to a longitudinal axis of the first annular frame.

3. The flow-straightener apparatus of claim 1, wherein the straight segment extends in a direction parallel to a longitudinal axis of the first annular frame.

4. The flow-straightener apparatus of claim 1, wherein the curved segment of each of the plurality of flow-straightener vanes has a front surface with a first radius of curvature and a back surface with a second radius of curvature.

5. The flow-straightener apparatus of claim 1, wherein a cross-section of each of the plurality of flow-straightener vanes varies along a length of the vane between the first annular ring and the second annular ring.

6. The flow-straightener apparatus of claim 1, wherein the leading edge of each of the plurality of the flow-straightener vanes is arranged along an axis that intersects a common center of the first annular frame and the second annular frame.

7. The flow-straightener apparatus of claim 1, wherein a tip of the leading edge of each of the plurality of flow-straightener vanes has a radius of curvature.

8. The flow-straightener apparatus of claim 1, wherein the leading edge and the trailing edge of each of the plurality of flow-straightener vanes are parallel to each other.

9. The flow-straightener apparatus of claim 1, wherein the trailing edge has a thickness that is the same as or greater than a thickness of the leading edge of each of the plurality of flow-straightener vanes.

10. The flow-straightener apparatus of claim 1, further comprising:
a third annular frame arranged concentrically within the second annular frame.

11. The flow-straightener apparatus of claim 10, further comprising:
a second plurality of flow-straightener vanes each having a first end coupled to an interior surface of the second annular frame and a second end coupled to an exterior surface of the third annular frame, wherein the second plurality of flow-straightener vanes each have a leading edge and a trailing edge, wherein the second plurality of flow-straightener vanes each have a curved segment.

12. The flow-straightener apparatus of claim 11, wherein the first plurality of flow-straightener vanes is greater in number than the second plurality of flow-straightener vanes.

13. The flow-straightener apparatus of claim 1, further comprising:
a flange coupled to and radially extending from an exterior surface of the first annular frame.

14. The flow-straightener apparatus of claim 1, further comprising:
a plurality of reinforcing webs coupled between the flange and the first annular frame.

15. A flow-straightener system, comprising:
a mix manifold comprising a cylindrical chamber; and
a flow-straightener apparatus arranged within an upper portion of the mix manifold and concentrically arranged within the cylindrical chamber of the mix manifold, the flow-straightener apparatus comprising (i) a first annular frame, (ii) a second annular frame arranged concentrically within the first annular frame and (iii) a plurality of flow-straightener vanes each having a first end coupled to an interior surface of the first annular frame and a second end coupled to the second annular frame, wherein the plurality of flow-straightener vanes each have a leading edge and a trailing edge, wherein the plurality of flow-straightener vanes each have a curved segment, wherein the curved segment of each of the plurality of flow-straightener vanes extends between the leading edge and a transition point and wherein the plurality of flow-straightener vanes each have a straight segment extending between the transition point and the trailing edge.

16. The flow-straightener system of claim 15, wherein the flow-straightener apparatus further comprises a flange coupled to an exterior surface of the first annular frame and wherein the mix manifold further comprises at least one flange on an exterior surface of the mix manifold.

17. The flow-straightener assembly system of claim 15, wherein the mix manifold further comprises two inlet openings coupled to opposite sides of a lower portion of a mix manifold sidewall and wherein the mix manifold further comprises two outlet openings coupled to the upper portion of the mix manifold.

18. The flow-straightener system of claim 17, wherein at least one adapter is coupled to one of the two inlet openings and configured to direct airflow tangentially into the cylindrical chamber of the mix manifold.

19. The flow-straightener system of claim 18, wherein the straight segment extends in a direction parallel to a common longitudinal axis of the first annular frame and the mix manifold.

* * * * *